United States Patent [19]

Iijima

[11] Patent Number: 5,581,708
[45] Date of Patent: Dec. 3, 1996

[54] DATA TRANSMISSION SYSTEM USING ELECTRONIC APPARATUS HAVING A PLURALITY OF TRANSMISSION PROTOCOLS

[75] Inventor: Yasuo Iijima, Yokohama, Japan

[73] Assignee: Kabushiki Kaisha Toshiba, Kawasaki, Japan

[21] Appl. No.: 215,573

[22] Filed: Mar. 22, 1994

[30] Foreign Application Priority Data

Mar. 23, 1993 [JP] Japan .................................... 5-062370

[51] Int. Cl.⁶ ............................ G06F 13/42; G06K 19/02
[52] U.S. Cl. ................. 395/200.14; 395/831; 364/240.8;
364/940.81; 235/380; 902/26
[58] Field of Search ............................... 395/200, 200.1,
395/200.12, 200.13, 200.17, 200.18, 831,
200.14; 235/380, 437, 492; 364/240.8,
940.81; 902/26

[56] References Cited

U.S. PATENT DOCUMENTS

| | | | |
|---|---|---|---|
| 4,766,534 | 8/1988 | DeBenedictis | 395/200 |
| 4,767,920 | 8/1988 | Kitta et al. | 235/380 |
| 4,845,717 | 7/1989 | Iijima | 235/437 |
| 4,855,905 | 8/1989 | Estrada et al. | 395/275 |
| 4,891,783 | 1/1990 | Aritaka et al. | 395/200 |
| 4,930,129 | 5/1990 | Takahira | 235/380 |
| 5,136,716 | 8/1992 | Harvey et al. | 395/200 |
| 5,191,653 | 3/1993 | Banks et al. | 395/275 |
| 5,226,155 | 7/1993 | Iijima | 902/26 |
| 5,237,693 | 8/1993 | Kiyohara et al. | 395/200 |
| 5,245,703 | 9/1993 | Hubert | 395/200 |
| 5,278,972 | 1/1994 | Baker et al. | 395/200 |
| 5,349,649 | 9/1994 | Iijima | 395/200 |
| 5,420,412 | 5/1995 | Kowalski | 235/492 |
| 5,425,032 | 6/1995 | Shloss et al. | |

FOREIGN PATENT DOCUMENTS

| | | |
|---|---|---|
| 0202622 | 11/1986 | European Pat. Off. . |
| 0446940 | 9/1991 | European Pat. Off. . |
| 2612316 | 9/1988 | France . |
| 2635886 | 3/1990 | France . |
| 130040 | 6/1987 | Japan . |
| 250726 | 10/1988 | Japan . |
| 4321192 | 11/1992 | Japan . |

OTHER PUBLICATIONS

ISO/JTC 1/SC 17/WG 4 N 416, ISO, "Appreciation to KTAS", Jul. 1988.
Patent Abstracts of Japan, JP870083749, Shigeru et al., vol. 013064, Feb. 14, 1989.
Patent Abstracts of Japan, JP850268341, Koichi, vol. 011351, Nov. 17, 1987.

*Primary Examiner*—Alyssa H. Bowler
*Assistant Examiner*—Mark H. Rinehart
*Attorney, Agent, or Firm*—Cushman Darby & Cushman, L.L.P.

[57] ABSTRACT

In a data transmission system, a card reader/writer provided in a terminal device and an IC card are connected through a contact unit, the IC card is started in response to a signal from the terminal device via the card reader/writer, and transmission/reception of data is subsequently performed. In this data transmission system, the IC card has a CPU for outputting a predetermined answer-to-reset data after the IC card is started and controlling at least two protocols, and a memory for storing protocol type information for determining a protocol to be used from the protocols. The control unit is operated upon starting the IC card, renews the protocol type information in outputting the answer-to-reset data, and returns the renewed protocol type information to an initial one in response to transmission/reception of the data.

7 Claims, 5 Drawing Sheets

DATA TRANSMISSION SYSTEM USING ELECTRONIC APPARATUS HAVING A PLURALITY OF TRANSMISSION PROTOCOLS

BACKGROUND OF THE INVENTION

1. Field of the Invention

The present invention relates to a data transmission system for performing transmission/reception of data in accordance with a predetermined transmission protocol between the card reader/writer of a terminal device and an IC card connected to the card reader/writer.

2. Description of the Related Art

In recent years, as a portable data storing/processing medium used in various applications, an IC card incorporating an IC chip having a nonvolatile data memory and a control element such as a CPU for controlling the data memory has received a great deal of attention.

The IC card of this type is generally inserted into a terminal device and connected to the terminal device through a card reader/writer arranged in the terminal device, thereby performing a predetermined function such as a transaction function. This application function is generally initialized such that command data is sent from the terminal device to the IC card. The IC card generally operates as follows. The IC card receives the command data from the terminal device through the card reader/writer, decodes a function code included in the command data, performs processing corresponding to the function code, and then returns data representing the processing result as response data to the terminal device through the card reader/writer.

In this case, the IC card generally performs transmission/reception of data with the card reader/writer in accordance with a transmission protocol which is a data transmission standard defined in the known ISO/IEC 7816-3 standard rule.

At this time, when the IC card supports a plurality of different transmission protocols, i.e., when the IC card has a plurality of protocols corresponding to a plurality of application systems for service or transaction performed using the IC card, the IC card can be commonly used in the plurality of applications by switching only the transmission protocols. In other words, the IC card can be commonly applied to these systems.

In such a data transmission system, such as that known in the prior art such as Japanese Patent Application (KOKAI) Publication No.4-321192, when a plurality of transmission protocols are switched in accordance with an application purpose, a method called a PTS (Protocol Type Selection) method is defined in the ISO/IEC 7816-3 standard. According to the PTS method, when a plurality of transmission protocols are supported in one IC card, a transmission protocol to be used as a default protocol is always determined in an initial state. Therefore, when a transmission protocol other than the default protocol is to be used in the IC card, the PTS method must be used, and a transmission protocol to be used must be selected from the plurality of supported protocols.

As a method of selecting a transmission protocol to be used, the following method is considered. Priority information for a plurality of transmission protocols is stored in a nonvolatile memory (e.g., EEPROM) in the IC card, and this priority information is rewritten by a special command to set the transmission protocol used in the IC card itself to have the first priority, so that this transmission protocol is always used as a default protocol.

However, in order to use the above techniques, the same conditions for transmitting/receiving the command for performing the PTS method or the special command for changing the priority are used in the application systems. In particular, when the data transmission rates of the systems are different from each other, these techniques cannot be used.

SUMMARY OF THE INVENTION

It is an object of the present invention to provide a data transmission system wherein, when an IC card supports a plurality of transmission protocols, even when transmission conditions such as data transmission rates respectively used in the transmission protocols are different from each other, the transmission protocols can be selectively used.

It is another object of the present invention to provide a data transmission system wherein the number of times of access to a memory (EEPROM or the like) of an IC card in switching transmission protocols can be reduced, thereby elongating the life of the memory.

According to the first aspect of the present invention, there is provided a data transmission system in which a first electronic apparatus and a second electronic apparatus are connected through a signal transmission line, the second electronic apparatus is started in response to a signal from the first electronic apparatus, and transmission/reception of data is subsequently performed between the first and second electronic apparatuses, wherein the second electronic apparatus comprises protocol control means for controlling at least two protocols, storing means for storing protocol determination information which determines a protocol to be used from the protocols, means for transmitting ATR data including the protocol determination information to the first electronic apparatus in response to a signal from the first electronic apparatus, renewing means for renewing the protocol determination information in response to start of the second electronic apparatus, and returning means for returning the protocol determination information in response to the transmission/reception of data.

According to the second aspect of the present invention, there is provided a data transmission system in which a first electronic apparatus and a second electronic apparatus are connected through a signal transmission line, the second electronic apparatus is started in response to a signal from the first electronic apparatus, and transmission/reception of data is subsequently performed between the first and second electronic apparatuses, wherein the second electronic apparatus comprises protocol control means for controlling at least two transmission protocols, storing means for storing protocol determination information which determines a protocol to be used from the protocols, means for transmitting ATR data including the protocol determination information to the first electronic apparatus in response to a signal from the first electronic apparatus, renewing means for renewing the protocol determination information in response to start of the second electronic apparatus, and returning means for returning the determined protocol to an initial state in response to transmission of command data.

According to the third aspect of the present invention, there is provided a data transmission system in which a first electronic apparatus and a second electronic apparatus are connected through a signal transmission line, the second electronic apparatus can be operated by an operation voltage applied from the first electronic apparatus and started in response to a reset signal from the first electronic apparatus, and transmission/reception of data is subsequently performed between the first and second electronic apparatuses, wherein the second electronic apparatus comprises detecting means for detecting whether the second electronic apparatus is started upon reception of the operation voltage again or started in response to only the reset signal, protocol control means for controlling at least two protocols, storing means for storing protocol determination information for determining a protocol to be used from the protocols, and control means for performing control such that a protocol based on the protocol determination information is used when a detection result of the detecting means represents that the second electronic apparatus is started upon reception of the operation voltage again, and a protocol different from the protocol based on the protocol determination information is set when the second electronic apparatus is started in response to only the reset signal.

According to the fourth aspect of the present invention, there is provided a data transmission system in which a first electronic apparatus and a second electronic apparatus are connected through a signal transmission line, the second electronic apparatus is operated in response to a basic operation signal from the first electronic apparatus or started in response to a reset signal from the first electronic apparatus, and transmission/reception of data is subsequently performed between the first and second electronic apparatuses, wherein the second electronic apparatus comprises detecting means for detecting whether the second electronic apparatus is started upon reception of the basic operation signal again or started by changing only the reset signal, protocol control means for controlling at least two protocols, storing means for storing protocol determination information for determining a protocol to be used from the protocols, control means for performing control such that a protocol based on the protocol determination information is used when a detection result of the detecting means represents that the second electronic apparatus is started upon reception of the basic operation signal again, and a protocol different from the protocol based on the protocol determination information is used when the second electronic apparatus is started in response to only the reset signal, comparing means for comparing the used protocol with the protocol corresponding to the protocol determination information, and renewing means for renewing the protocol determination information only when it is confirmed in comparison by the comparing means that both the protocols do not coincide with each other.

According to the first aspect, a transmission protocol to be used is changed each time the second electronic apparatus (e.g., IC card) is started. At this time, the protocol to be used is held by inputting a command to the second electronic apparatus. In this manner, when the second electronic apparatus supports a plurality of protocols, the transmission protocols can be switched regardless of the difference between transmission conditions respectively used in the protocols.

According to the second aspect, although a protocol to be used is changed each time the second electronic apparatus is started, this changing operation is performed when the second electronic apparatus outputs ATR data. In this manner, the same operation effect as described in the first aspect can be obtained.

According to the third aspect, a default protocol and other protocols are selectively used depending on a result obtained by checking whether the second electronic apparatus is started upon reception of an operation voltage to the second electronic apparatus. In this manner, the same operational effect described in the first aspect can be obtained, and the number of times of access to the memory (EEPROM or the like) in switching the protocols can be reduced.

According to the fourth aspect, as in the third aspect, although a default protocol and other protocols are selectively used depending on a result obtained by checking whether the second electronic apparatus is started by applying an operation voltage to the second electronic apparatus, the data transmission apparatus further has a function of holding a protocol to be used. In this manner, the same operational effect as described in the third aspect can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A1–5A5 and 5B1–5B5 are timing charts for explaining the processing operation according to the embodiment in FIG. 4;

DETAILED DESCRIPTION OF THE PREFERRED EMBODIMENTS

An embodiment of the present invention will be described below with reference to the accompanying drawings.

Figure 1:
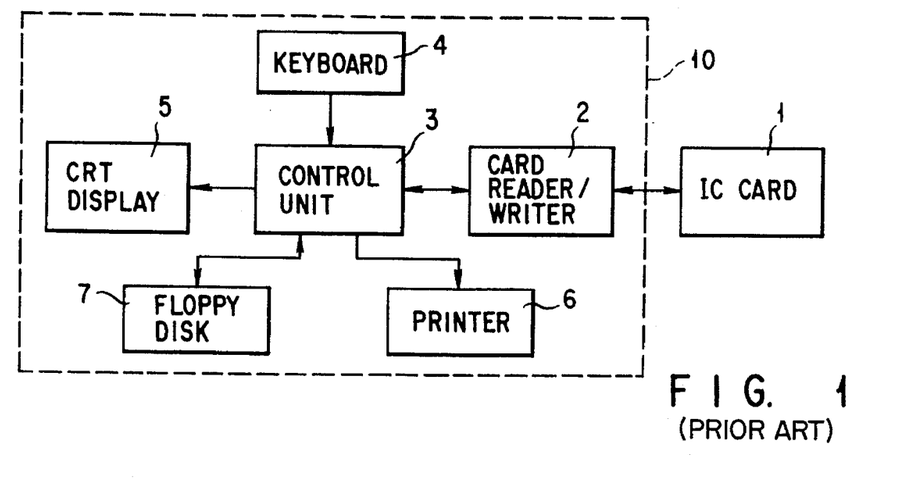
FIG. 1 is a schematic block diagram showing the arrangement of a card processing apparatus according to an embodiment of the present invention.

FIG. 1 is a block diagram showing the entire arrangement of a data transmission system according to this embodiment to which the present invention is applied, i.e., a card handling apparatus in which an IC card 1 is combined with a terminal device 10 such as a banking or shopping system.

Referring to FIG. 1, when the IC card 1 is inserted into the terminal device 10, the contact unit (to be described later) of the IC card 1 is connected to the contact unit of a card reader/writer 2, and the IC card 1 receives a voltage from a power supply provided in the terminal device 10 through the card reader/writer 2. At the same time, the IC card 1 is connected to a control unit 3 constituted by a CPU. The control unit 3 is connected to a keyboard 4, a CRT display 5, a printer 6, and a floppy disk 7 to constitute the terminal device 10.

Figure 2:
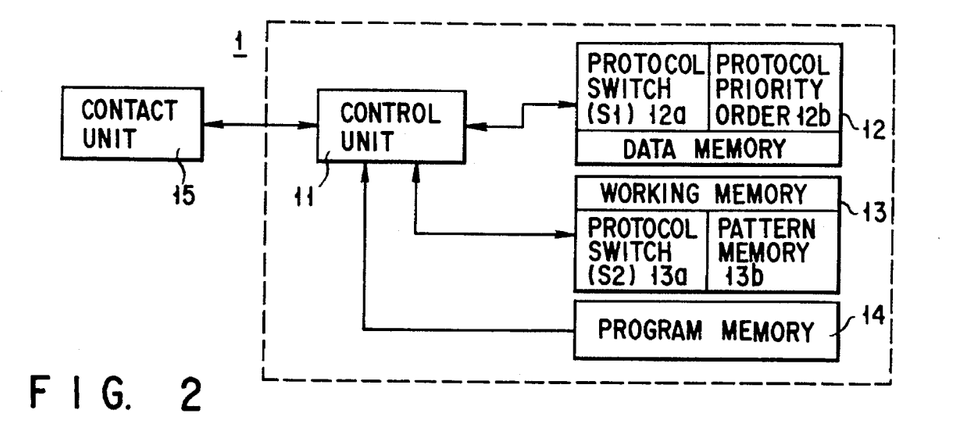
FIG. 2 is a schematic block diagram showing the electrical arrangement of an IC card.

FIG. 2 shows the arrangement of the IC card 1. The IC card 1 is constituted by a CPU 11 serving as a control unit, a programmable nonvolatile data memory 12, a working memory 13, a program memory 14, and a contact unit 15 for obtaining electrical contact with the card reader/writer 2. Of these constituent elements, the CPU 11, the data memory 12, the working memory 13, and the program memory 14, which are surrounded by a dashed line in FIG. 2, are constituted by one chip semiconductor device and buried in the IC card main body. Or, the portion surrounded by the dashed line may be constituted by combining two or more IC chips.

The data memory 12 is used to store various data, and is constituted by, e.g., an EEPROM or the like. The working memory 13 is a memory, e.g., a RAM for temporarily storing processing data used when the CPU 11 performs data processing. The program memory 14 is constituted by, e.g., a mask ROM, and stores a program for the CPU 11.

The card reader/writer 2 performs transmission/reception of function code data or processing data between the IC card 1 and the control unit 3, and has a function of performing a command-response operation for the IC card 1 in a one-to-one correspondence on the basis of a macro command from the control unit 3.

In this arrangement, an operation according to the first embodiment will be described below with reference to the flow chart shown in FIG. 4 and the timing charts shown in FIGS. 5A and 5B. Note that, in this embodiment, as transmission protocols supported by the IC card 1, two types of protocols A and B are used. The transmission rates of ATR (Answer To Reset) data corresponding to the protocols A and B are different from each other.

The data memory 12 includes a memory area provided for storing a "protocol switch S1" for determining a protocol used in the IC card 1 and a memory area provided for storing a priority order data (D) for determining the priority of the protocols.

A structure and a function of the "protocol switch S1" will be described below.

Although the "protocol switch S1" is realized by the data memory (EEPROM) 12, the content of the "protocol switch" is always rewritten. Since a number of rewriting operation is in inverse proportion to the service life of the data memory 12, the maximum number of rewriting operation allowed by the data memory 12 poses a problem.

Figure 3:
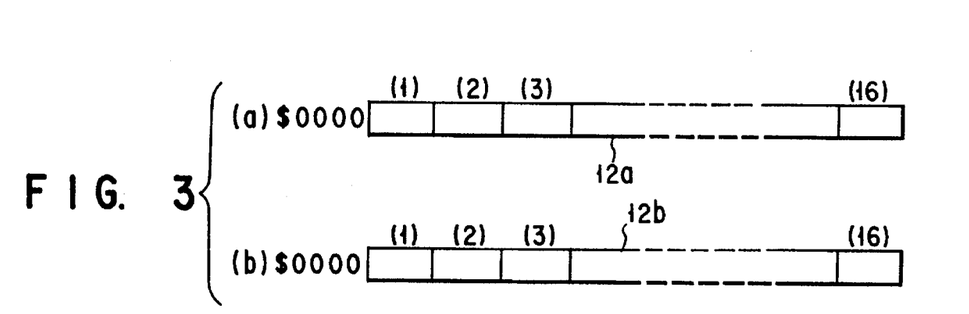
FIG. 3 is a view for explaining the protocol switch storing unit of a data memory.

As a storage portion for the "protocol switch S1", as shown in FIG. 3, for example, 16 bytes, i.e., '0000' to '000F' Of the data memory 12, are used. In initialization, this field is entirely set to be 'FF'. In this state, the protocol A is set as a current protocol.

The following values are assigned to the protocols, respectively.

'00': protocol A
'01': protocol B

When the content of the "protocol switch S1" is to be referred, the storage area in which the "protocol switch" is stored is searched from the address S000F to the address S0000. As a result, if neither '00' nor '01' is found, it is recognized that an initial default protocol (in this embodiment, the protocol A) is designated. If '00' or '01' is found, a protocol corresponding to the found value is used as a default protocol.

Now, the data transmission operation using the above-mentioned system will be described while the protocol is selectively used.

Figure 4:
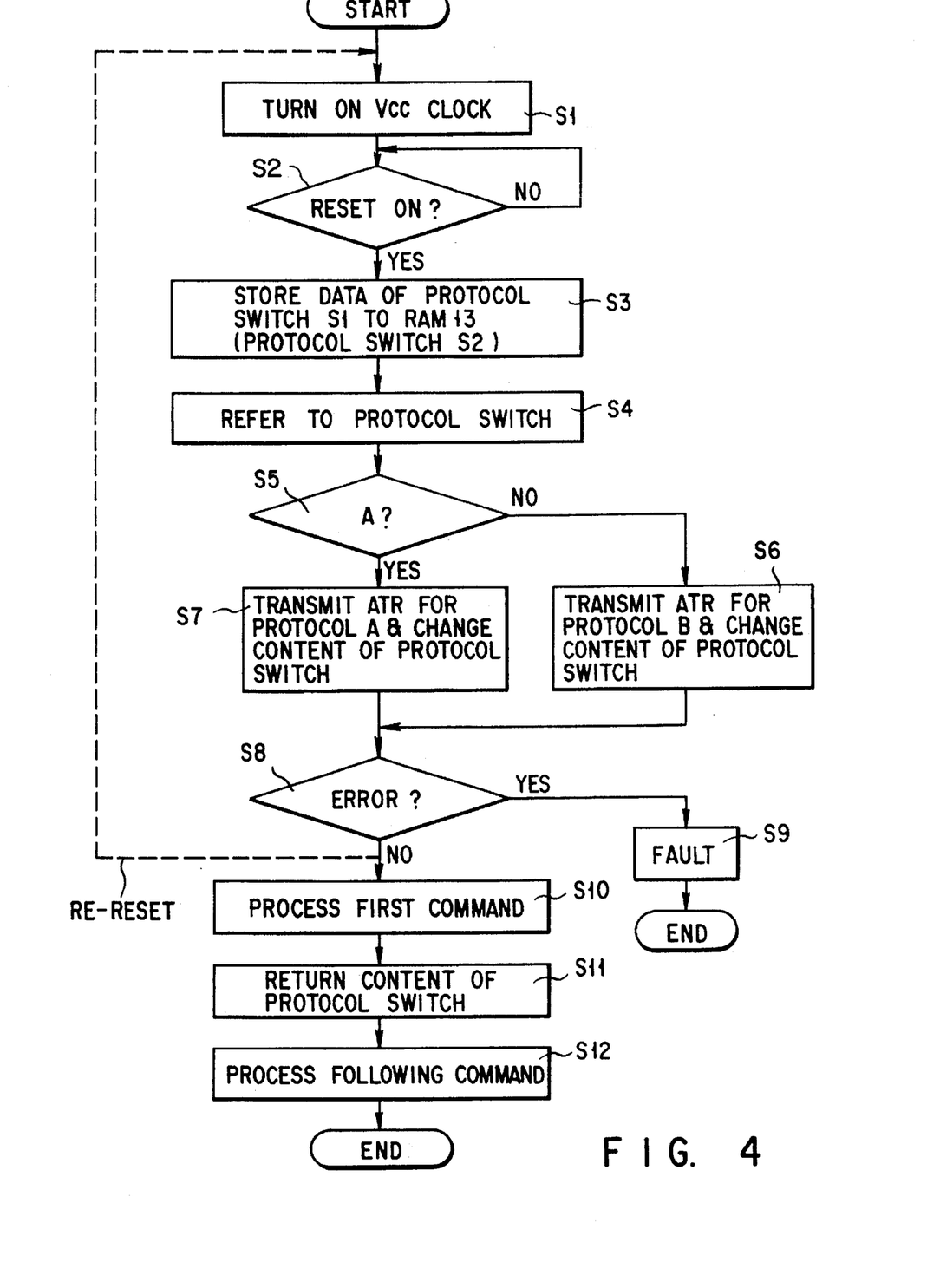
FIG. 4 is a flow chart for explaining a data transmission processing operation according to the first embodiment of the present invention.
Figure 5A:
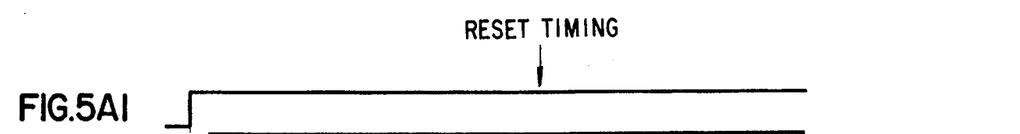
Figure 5A:
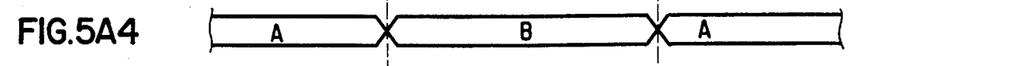
Figure 5A:
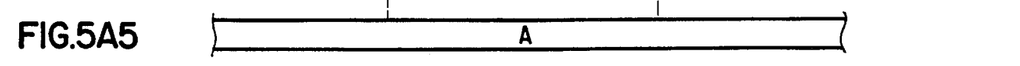
Figures 5A, 5A:
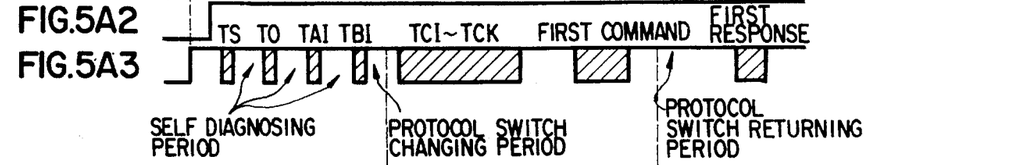
Figure 5B:
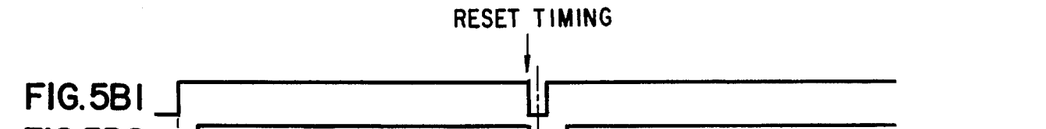
Figure 5B:
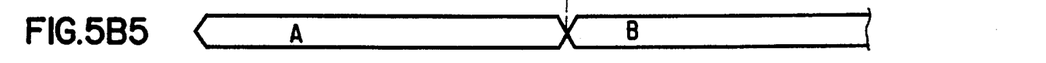
Figures 5B, 5B, 5B:
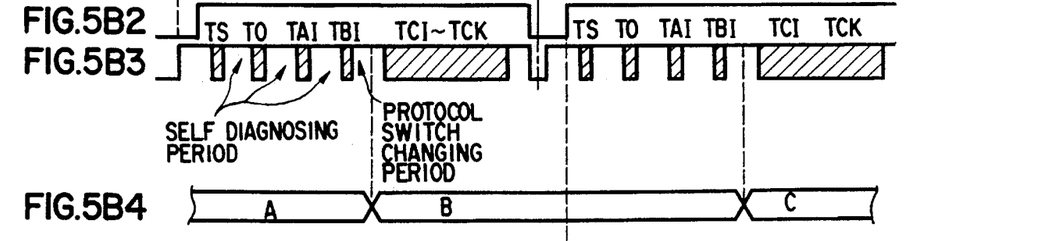

While the IC card 1 is inserted in the card reader/writer 2, the IC card 1 receives in step S1, through respective contacts of the contact unit 15, an operation voltage (Vcc) shown in (a) in FIG. 5A and a clock signal. Then, in step S2, a reset signal shown in (b) in FIG. 4 is sent from the card reader/writer 2 so as to comply with an electrical activation sequence defined by the ISO/IEC 7816-3 standard so as to start the IC card 1. When the IC card 1 is started, an internal program stored in the program memory 14 is started, in step S3, the IC card 1 copies the content of a "protocol switch S1" in the data memory 12 to a predetermined position or the protocol switch S2 of the incorporated working memory 13 and refers to the content in step S4. In step S5, it is checked whether the content of the "protocol switch S2" is set in the protocol A or B.

Thereafter, when this set transmission protocol is the protocol A, the flow advances to step S7 to transmit the ATR data corresponding to the protocol A to the card reader/writer 2 at a corresponding transmission rate. Prior to this, the IC card 1 performs self-diagnosing processing in a self-diagnosing period shown in FIG. 5A3 to check the functions of the registers and RAMs in the IC card 1. After the ATR data is transmitted, in the IC card 1, the content of the "protocol switch S2" stored at the predetermined position of the working memory (RAM) 13 is changed to the protocol B.

The self-diagnosing processing, as shown in FIG. 5A3, is performed in the idle state holding periods between TS byte transmission and T0 byte transmission, between the T0 byte transmission and TA1 byte transmission, and between the TA1 byte transmission and TB1 byte transmission. In addition, the changing period of the "protocol switch S2" is set between the TB1 byte transmission and TC1 byte transmission.

If a transmission protocol set in the "protocol switch S2" is the protocol B, the flow advances to step S6 to transmit the ATR data corresponding to the protocol B to the card reader/writer 2 at a corresponding transmission rate. At this time, the IC card 1, as in the protocol A, performs self-diagnosing processing in the self-diagnosing periods so as to check the functions of the registers and RAMs in the IC card 1.

The ATR data contains protocol data to be used in the IC card 1, and the ATR data is sent to the terminal device in which the ATR data is identified.

When the above processing is erroneously ended, the flow advances from step S8 to step S9. At this time, the processing is ended in a halt state.

If there is no error, the flow advances from step S8 to step S10 to transmit a first command from the terminal device 10 to the IC card 1 in the protocol A or B based on a corresponding one of the pieces of protocol information respectively included in the ATR data of the protocols A and B defined by the protocol switch S2 stored in the RAM 13. In the IC card 1, processing based on the first command is performed, and data of the obtained processing result is transmitted to the card reader/writer 2 in the protocol B or A defined by the "protocol switch S2" in the working memory 13. Note that, after the IC card 1 receives the first command from the terminal device 10 to perform predetermined data processing and data transmission, the IC card 1 returns the content of the "protocol switch S2" in step S11 to set the content of the protocol to the content obtained in the initial state. The step S11 is followed by the step S12 in which a predetermined processing defined by the command data.

As shown in FIGS. 5A1–5A5, command processing is performed after the ATR data is transmitted, the content of the "protocol switch" is returned, and a first response is transmitted. In this case, even after the next electrical activation is performed, the same protocol as that used during transmission of the ATR data is set in a current state.

If electrical non-activation, i.e., a reset operation (only a reset signal is activated as shown in FIG. 5B2) is performed without performing transmission/reception of command/response and performing transmission of the first command in FIG. 5A1–5A5, the operation is returned to the step S1 in FIG. 4. Therefore, the content of the "protocol switch" is not returned. For this reason, after the next electrical activation is performed in the steps S1 to S4, another protocol (supported next) is set in a current state. In this case, the content of the "protocol switch S2" is changed from protocol A to protocol B as shown FIG. 5B in response to the reset signal shown in FIG. 5B2.

A method of renewing the content of the "protocol switch S2" is as follows. That is, when ATR data is transmitted in steps S6 and S7, a value representing a protocol having a priority next to the protocol currently used as the default protocol is set in the byte next to the byte which is referred to. When the first command is input in step S10, a value representing the protocol S2 currently used is set in the next byte.

In the first embodiment, a case wherein a reset operation includes a turn-off operation of the operation voltage (Vcc) has been described.

Figure 6:
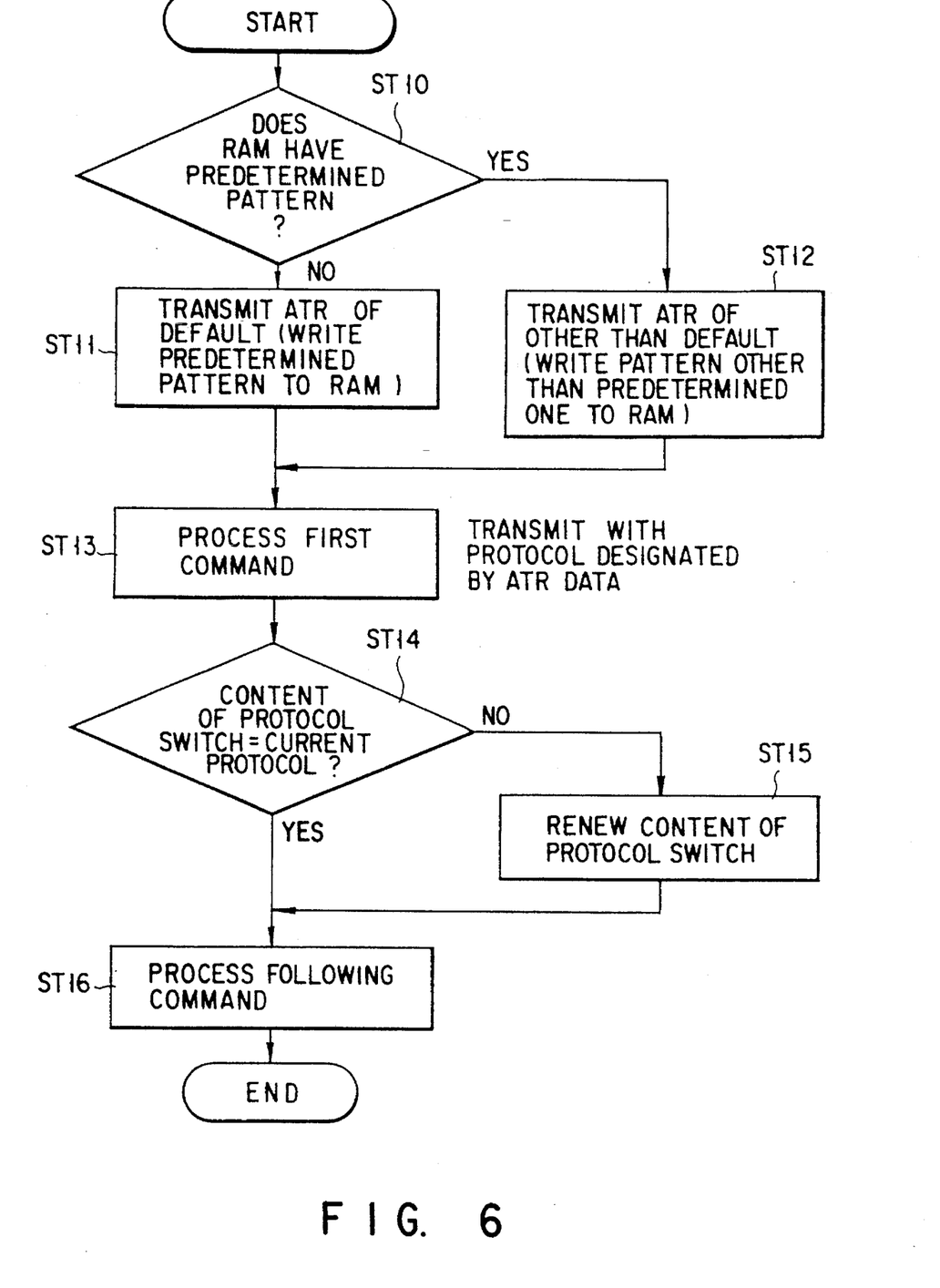
FIG. 6 is a flow chart for explaining a processing operation according to the second embodiment of the present invention.

As the second embodiment, an operation obtained when second and subsequent reset operations are performed while an operation voltage (Vcc) is held will be described below with reference to the flow chart shown in FIG. 6.

When a reset state is released while the operation voltage (Vcc) is held, an IC card 1 is started. At this time, the IC card 1 refers to a predetermined area (e.g., first 10 bytes) in a working memory 13 serving as a RAM in step ST10, and the IC card 1 checks whether the RAM 13 has a predetermined pattern (e.g., increment data starting from '56' Hex).

If NO in step ST10, the flow advances to step ST11 to access the data memory 12, and data content set as the default in a "protocol switch S1" area of the data memory 12 is copied to a predetermined position or the protocol switch S2 of the incorporated working memory 13 (RAM). The ATR data of a protocol corresponding to the data content is transmitted to a card reader/writer 2 of a terminal device 10. Thereafter, the pattern in the predetermined area of the working memory 13 is changed into the predetermined pattern.

On the other hand, if YES in step ST10, the flow advances to step ST12 to transmit ATR data corresponding to a protocol other than a default protocol defined by the "protocol switch" to the card reader/writer 2. The pattern in the predetermined area of the working memory 13 is rewritten into a pattern other than the predetermined pattern.

When a first command from the terminal device 10 is input to the IC card 1, in step ST13, processing data is returned to the terminal device 10 in a protocol designated by ATR data. At this time, the content of the "protocol switch S1" is compared with the content of a current protocol S2 in step ST14. If NO in step ST14, the flow advances to step ST15 to renew the content of the "protocol switch S1". Thereafter, processing for the subsequent commands is performed in step ST16.

The number of times of access (rewrite) to the "protocol switch S1" data memory (EEPROM) 12 of the second embodiment is smaller than that of the first embodiment.

Note that, when the IC card supports three or more types of protocols, a predetermined pattern is written in the working memory 13 by ATR data, and, at the same time, the value of a protocol to be used next is set in the working memory 13. When it is checked whether the working memory 13 has a predetermined pattern, a protocol corresponding to this value is employed.

According to a method of renewing the content of the "protocol switch S1" in step ST15, a value representing a protocol currently used is set in the byte next to the byte which is referred to.

In renewing the content of the content of the "protocol switch S1", when an area for storing the corresponding data is larger than the storage area of the data memory 12, the entire area is rewritten by 'FF' and set at an address $0000.

In particular, when the number of types of protocols supported by the IC card 1 increases, the number of types of values representing the protocols is increased, the order of use of the protocols is set. In this manner, the sequence of this embodiment can cope with the increase in number of types of protocols.

Figure 7:
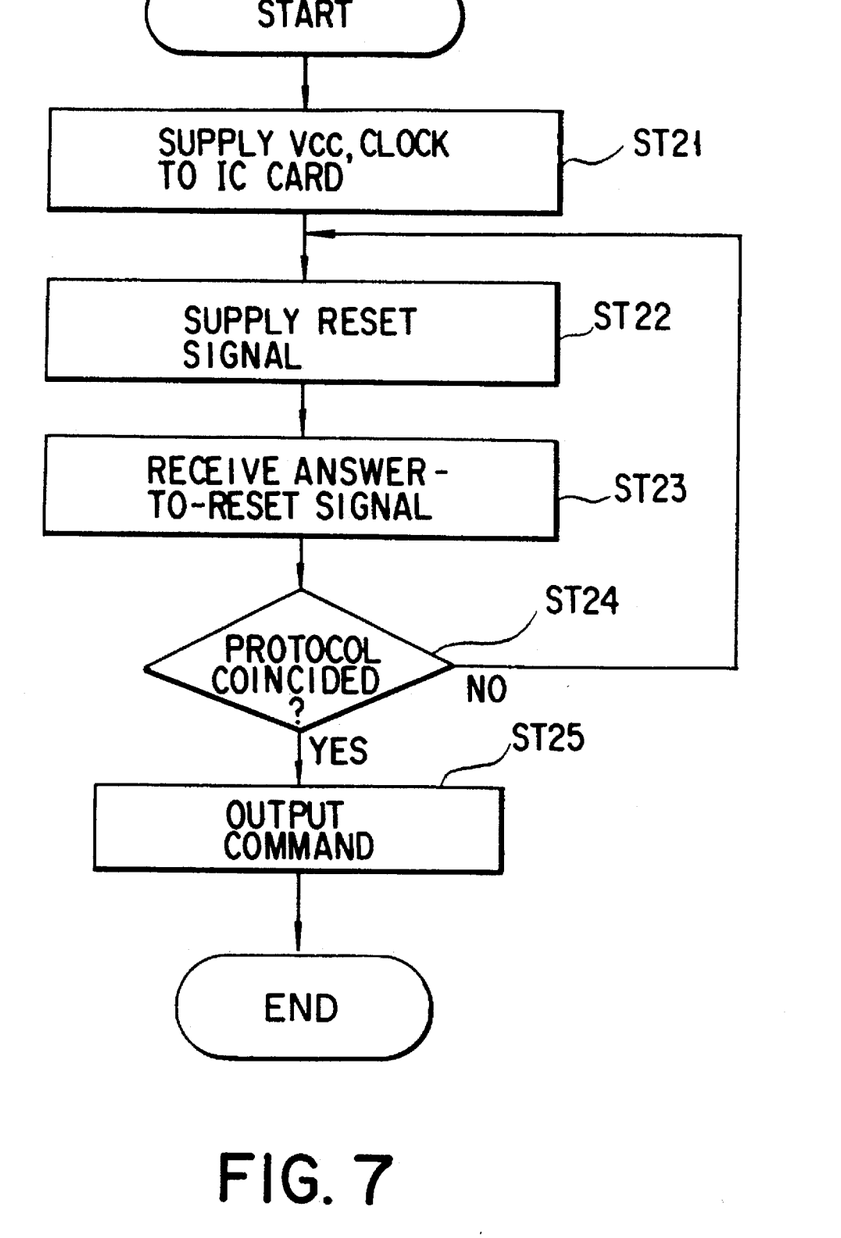
FIG. 7 is a flow chart for explaining the operation of the terminal device shown in FIG. 1.

Now, the operations of the terminal device 10 shown in FIG. 1 by referring to the flow chart shown in FIG. 7.

When the IC card 1 is inserted to the terminal device 10 and is connected to the card reader/writer 2, a source voltage Vcc and a clock signal are supplied to the IC card 1 in step ST21. Then, as shown in FIG. 5A or 5B, a reset signal is supplied to the IC card 1 to initialize the IC card 1 in step ST22. In response to the reset signal the IC card 1 sends forth an answer-to-reset (ATR) signal to the terminal device 10 which receives the same in step ST23. Protocol data included in the received ATR signal is extracted in step ST24 to check whether the received protocol matches to one which should be used in the terminal device at this time. If NO in step ST24 the operation returns to the step ST22. While, if the answer is YES, the operation advances to step ST25 in which a predetermined command data is output from the terminal device 10 to the IC card 1 via the card reader/writer 2.

In the above-mentioned embodiments, it is checked by the contents of the working memory (RAM) in an operation state whether a reset signal is supplied again together with the operation voltage (Vcc) and signals such as a clock signal required for the operation or only the reset signal is supplied again. However, a dedicated circuit may be incorporated in the IC card to perform this checking operation.

Although an IC card has been exemplified as the second electronic apparatus in this embodiment, as in the above embodiment, the present invention can be applied to not only the IC card but also a system selectively using a plurality of protocols in data transmission. Various changes and modifications can be effected such that not only an apparatus having a card-like shape but also an apparatus having a rod- or block-like shape can be used as the second electronic apparatus.

As has been described above, there can be provided a transmission control system wherein, when the second electronic apparatus (e.g., IC card) supports a plurality of protocols, protocols can be switched regardless of the difference between transmission conditions respectively used for the protocols or the difference between the specifications of the commands used for selecting one of the protocols.

In addition, a transmission control system capable of reducing the number of times of access to a memory (EEPROM or the like) in switching protocols can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An IC card to be started in response to a first reset signal supplied from an external device to communicate based on at least one of a first communication protocol and a second communication protocol, said IC card comprising:

detection means for detecting the first reset signal supplied from the external device;

storage means for storing first protocol data representing a type of the first communication protocol to be used for communication with the external device;

outputting means for outputting first response data including the first protocol data in response to the first reset signal detected by said detection means, the first response data being output based on the first protocol; and updating means for updating the first protocol data stored in said storage means with second protocol data representing the second communication protocol, said first protocol data being updated in synchronism with the output of the first response data outputted from said outputting means.

2. An IC card according to claim 1, further comprising restoration means for restoring the second protocol data stored in said storage means to the first protocol data when transmission data is supplied from said external device using the first communication protocol after the first response data is outputted from said outputting means.

3. An IC card according to claim 1, wherein said storage means comprises:

a nonvolatile memory for storing data representing at least the first and second transmission protocols to be used for communication with said external device together with data denoting a priority order of the communication protocol; and volatile memory for storing protocol data representing the first protocol data, the first protocol data corresponding to the data stored in said nonvolatile memory being used first when the first reset signal is detected by said detection means.

4. An IC card according to claim 3, wherein said updating means includes means for changing the protocol data stored in said volatile memory to data denoting a next priority order protocol in synchronism with the first response data outputted from said outputting means.

5. An IC card according to claim 4, wherein said outputting means comprises means for outputting second response data including the next priority order protocol data stored in said volatile memory as a response to the second reset signal, the second response data being output after the first response data has been outputted from said outputting means and a second reset signal has been detected by said detection means.

6. A method of changing data transmission protocols used for communication of data between a first device and a second device, wherein communication by the second device is started in response to a first reset signal supplied from the first device, the second device communicating with the first device using one of at least a first protocol and a second protocol, said method comprising the steps of:

preliminarily storing, in storage means of the second device, first protocol data denoting a kind of protocol to be used for the initial communication with the first device;

detecting the first reset signal supplied from the first device;

reading first protocol data stored in the storing means in response to the detection of the first reset signal;

supplying, in response to the first reset signal, first response data to the first device including the first protocol data;

changing the protocol data stored in the storage means to the second protocol data in synchronism with the supply of the first response data;

detecting transmission data from the first device after the first response data is supplied to the first device;

restoring the protocol data stored in the storage means to the first protocol data when transmission data, which is based on the first protocol, is supplied by the first device; and outputting second response data including the second protocol data when a second reset signal is supplied from the first device, the second response data being output based on the second protocol.

7. A data transmission system comprising a first device and a second device, the second device being started in response to a first reset signal supplied from the first device to communicate data with the first device using one of at least a first protocol and a second protocol, wherein said first device comprises:

resetting means for supplying a first reset signal to said second device;

reception means for receiving first response data including a protocol data from said second device;

means for determining whether protocol data received from said second device coincides with the protocol being currently used by the first device; and means for outputting a command to said second device when it is determined that the received protocol data coincides with the protocol being currently used by the first device, a second reset signal being supplied by said resetting means when it is determined that the received protocol data does not coincide with the protocol being currently used by the first device; and wherein said second device comprises:

detection means for detecting the first reset signal supplied from said first device;

storage means for storing first protocol data denoting a kind of protocol used for the data communication with the first device;

output means for outputting the first response data including the first protocol data in accordance with the first protocol, the first response data being output in response to the first reset signal detected by the detection means;

updating means for updating the protocol data stored in the storage means to second data denoting the second protocol, the updating means updating the storage means in synchronism with the output of the first response signal by the outputting means;

means for restoring the protocol data stored in the storage means to the first protocol data when a command is supplied by the first device based on the first protocol after the first response signal is outputted; and means for outputting the second response data in response to the second reset signal, the second response data including the second protocol data and being output based on the second protocol.

* * * * *